United States Patent
Saito et al.

(10) Patent No.: US 7,934,752 B2
(45) Date of Patent: May 3, 2011

(54) IMAGE FORMING METHOD AND RECORDED MATTER

(75) Inventors: Norikazu Saito, Tokyo (JP); Fumihiko Mizukami, Tokyo (JP); Makoto Aoyagi, Tokyo (JP); Tetsuya Matsuyama, Tokyo (JP); Hiroshi Funada, Tokyo (JP); Tadahiro Ishida, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 942 days.

(21) Appl. No.: 10/592,452

(22) PCT Filed: Mar. 8, 2004

(86) PCT No.: PCT/JP2004/063487
§ 371 (c)(1),
(2), (4) Date: Sep. 8, 2006

(87) PCT Pub. No.: WO2005/084960
PCT Pub. Date: Sep. 15, 2005

(65) Prior Publication Data
US 2008/0240787 A1    Oct. 2, 2008

(30) Foreign Application Priority Data

Mar. 8, 2004 (JP) ................................ 2004-063487
Mar. 31, 2004 (JP) ................................ 2004-104586
Mar. 31, 2004 (JP) ................................ 2004-106969

(51) Int. Cl.
*B42D 15/00* (2006.01)
*B42D 15/10* (2006.01)

(52) U.S. Cl. ................ 283/94; 283/72; 283/85; 283/86; 283/88; 283/89

(58) Field of Classification Search .................. 250/271, 250/316.1; 283/72, 85, 87, 88, 89, 90, 94, 283/107, 117, 901, 86, 92; 428/32.6, 543, 428/913, 914

See application file for complete search history.

(56) References Cited

U.S. PATENT DOCUMENTS

| 5,414,262 | A  | * | 5/1995  | Filo ........................... 250/316.1 |
| 5,856,048 | A  |   | 1/1999  | Tahara et al. |
| 6,155,168 | A  |   | 12/2000 | Sakamoto |
| 6,530,601 | B2 | * | 3/2003  | Greene ........................... 283/72 |
| 6,616,190 | B1 |   | 9/2003  | Jotcham |
| 6,718,880 | B2 | * | 4/2004  | Oshima et al. .................. 283/86 |
| 2003/0124436 | A1 | * | 7/2003 | Shioda et al. ..................... 430/1 |

FOREIGN PATENT DOCUMENTS

| CN | 1072136 A  | 5/1993 |
| JP | 02-212195  | 8/1990 |
| JP | 05-330251  | 12/1993 |

(Continued)

*Primary Examiner* — Dana Ross
*Assistant Examiner* — Justin V Lewis
(74) *Attorney, Agent, or Firm* — Ladas & Parry LLP (57) ABSTRACT

An image forming method is provided to attain a higher security for preventing forgery and falsification of information by using an optical diffraction structure. In a body (10) whereupon a layer is to be transferred, printing information (2) is recorded. On the body (10), a layer (20*d*) including a hologram and a diffraction lattice provided on an optical diffraction structure transfer sheet (20) is transferred, and an image including recorded printing information (2) and optical diffraction structures (3, 4, 5) is formed. The layer (20*d*) including the optical diffraction structure is transferred so that the diffraction lattice (5) to be transferred forms diffraction lattice information (5) showing a prescribed regularity in a corresponding relationship between the printing information (2).

7 Claims, 10 Drawing Sheets

FOREIGN PATENT DOCUMENTS

| | | | |
|---|---|---|---|
| JP | 06-247084 | | 9/1994 |
| JP | 06247084 A | * | 9/1994 |
| JP | 08-118857 | | 5/1996 |
| JP | 10-250214 A | | 9/1998 |
| JP | 11-42864 | | 2/1999 |
| JP | 11-353518 | | 12/1999 |
| JP | 11353518 A | * | 12/1999 |
| JP | 2000-272276 A | | 3/2000 |
| JP | 2000-177229 A | | 6/2000 |
| JP | 2001-030666 | | 2/2001 |
| JP | 2002-72835 | | 3/2002 |
| KR | 2001-0071507 A | | 7/2001 |

* cited by examiner

FIG. 14

IMAGE FORMING METHOD AND RECORDED MATTER

TECHNICAL FIELD

The present invention relates to a method of forming an image including an optical diffraction structure, and a recorded matter.

BACKGROUND ART

A method of forming an image including print information and an optical diffraction structure is widely known as a security countermeasure against falsification of information. For the image forming method, there is known a method of transferring a layer in which the optical diffraction structure of an optical diffraction structure transfer sheet to predetermined information on a transfer object after the predetermined information is printed on the transfer object (For example, see Patent Document 1).

Patent Document: Japanese Patent Laid-Open No. 8-118857

DISCLOSURE OF THE INVENTION

Problem to be Solved by the Invention

The above method has a main purpose of focusing difficulty of optical diffraction structure production or reproduction to prevent forgery of the information. However, because a technology concerning the optical diffraction structure is developed in recent years, it is hardly adequate in security to only transfer the optical diffraction structure on to the information to be prevented the forgery. In the above method, when the information previously printed on the transfer object is printed by a thermal transfer method, there is also a problem that the optical diffraction structure is not in close contact with the portion where the information is printed.

In view of the foregoing, an object of the invention is to provide an image forming method and the like which utilize the optical diffraction structure to realize a higher degree of security for preventing the forgery and falsification of the information, and an image forming method and the like which can provide the optical diffraction structure even on the portion where the information is previously formed even by the thermal transfer method.

Means for Solving the Problem

In order to solve the above problems, a first image forming method of the invention is a forming image method in which an image including recorded information and an optical diffraction structure is formed by transferring a layer provided in an optical diffraction structure transfer sheet on a transfer object, the layer including an optical diffraction structure, the information being recorded on the transfer object, wherein the layer including the optical diffraction structure is transferred such that the transferred optical diffraction structure forms information indicating predetermined regularity in a corresponding relationship with the recorded information.

According to the recorded matter in which the image is formed by the first image forming method of the invention, because the predetermined regularity can be generated between the information already recorded in the recorded matter and the transferred optical diffraction structure, it is necessary that the information by the optical diffraction structure be also falsified so as to satisfy the regularity when the recorded information is falsified. Accordingly, the falsification and forgery becomes more difficult in comparison with the simple reproduction or production of the optical diffraction structure, and the higher degree of security can be realized. Even if contents of the information previously recorded in the transfer object are changed, because the contents of information can be transferred according to the information, a width of the information is widened and the recorded matter of the invention can be utilized in various applications.

"Predetermined regularity" shall mean not only the case in which a directly particular relationship holds between the recorded information and the information formed by the optical diffraction structure, which are included on the same recorded matter i.e. correspond to each other but also regularity among the plural recorded matters which can be derived from each recorded information and each information formed by the optical diffraction structure. Any optical diffraction structure transfer method such as the thermal transfer method and a laser beam method can be employed as long as the information having the predetermined regularity can be formed. The optical diffraction structure shall include both a hologram which is of an interference fringe forming a predetermined shape and a diffraction grating which is of an even convexconcave pattern. "Optical diffraction structure" shall include the so-called diffraction grating in which a constant convexconcave pattern is repeated and the so-called hologram formed by the interference fringe representing the predetermined shape.

In order to solve the above problems, a first recorded matter of the invention is realized by a recorded matter which is obtained by transferring a layer provided in an optical diffraction structure transfer sheet on a transfer object, the layer including a optical diffraction structure, the information being recorded on the transfer object, the recorded matter including the recorded information and the optical diffraction structure, wherein the recorded information and information formed by the transferred optical diffraction structure correspond to each other so as to generate predetermined regularity.

According to the first recorded matter of the invention, the optical diffraction structure transferred to the recorded matter corresponds to the recorded information so as to have the predetermined regularity, so that the higher degree of security can be provided as described above. Also, the recorded information and the information formed by the transferred optical diffraction structure may be synchronized with each other. Thereby, the higher degree of security can be provided only by synchronizing the information formed by the optical diffraction structure with the already recorded information. The synchronized information shall mean information which coincides with the recorded information in visual, audible, and ideological manners. The ideological coincidence shall mean a relationship in which the same things, e.g., a Japanese word and an English word thereof, can be associated with each other.

Moreover, the recorded information may be recorded with ink which is invisible in visible light. Thereby, the recorded information is invisible in the visible light and the recorded information is visible in the light such as an ultraviolet ray except for the visible light, so that the higher degree of security can be realized.

In order to solve the above problems, a second image forming method of the invention is an image forming method of forming an image including an optical diffraction structure, the image forming method comprising an optical diffraction structure transfer process of transferring an optical diffraction structure layer including a optical diffraction structure from an optical diffraction structure transfer sheet to a transfer object while a particular area of the transfer object is avoided, the optical diffraction structure layer including an optical diffraction structure; and an ink transfer process of transferring an ink layer from an ink transfer sheet to the particular area, the ink layer including an invisible ink portion formed by ink which is invisible in visible light, the ink transfer sheet being laminated on a base material sheet.

According to the second image forming method of the invention, the image is formed by the ink layer having the invisible ink portion formed by the ink which is invisible in the visible light, so that the information which is invisible in the visible light can be added. Furthermore, because the optical diffraction structure layer is not transferred to the particular area to which the ink layer is transferred, an edge of the ink layer which becomes conspicuous by providing the ink layer on the optical diffraction structure layer can be kept inconspicuous, and the existence of the ink layer can hardly be recognized at a glance particularly in the case where the whole of the ink layer is substantially transparent. The transfer in the ink transfer process includes the case in which only the ink layer is transferred and the case in which another layer is also transferred as well as the ink layer. The transfer in the optical diffraction structure transfer process includes the case in which only the optical diffraction structure layer is transferred and the case in which another layer is transferred as well as the optical diffraction structure layer.

"Ink which is invisible in visible light" means so-called stealth ink which becomes visible by fluorescence or color development in the light except for the visible light. "Invisible ink portion" may be the whole of the ink layer or "invisible ink portion" having a predetermined shape may be included in the ink layer. In the case where the invisible ink portion is the whole of the ink layer, for example, the whole of the particular area exhibits the fluorescence in the light except for the visible light.

In the case where the invisible ink portion is formed in the predetermined shape, the shape in the particular area becomes visible in the light except for the visible light. The order is arbitrary in the optical diffraction structure transfer process and the ink transfer process. "Optical diffraction structure" includes the so-called diffraction grating in which the constant convexconcave pattern is repeated and the so-called interference fringe expressing a predetermined shape.

In the second image forming method of the invention, the optical diffraction structure layer may be transferred in the optical diffraction structure transfer process after the ink layer is transferred in the ink transfer process. In this case, a transfer layer including the ink layer may be laminated on the base material sheet, and the transfer layer may be transferred to the transfer object in the ink transfer process so that a layer containing a mold releasing agent is left on a surface of the transfer layer. Therefore, the surface of the transfer layer contains the mold releasing agent, then the optical diffraction structure layer does not adhere to the surface. Accordingly, the optical diffraction structure layer can easily be transferred while the transfer layer avoids the already transferred area.

On the other hand, the ink layer may be transferred in the ink transfer process after the optical diffraction structure layer is transferred in the optical diffraction structure transfer process. Therefore, the ink layer can be transferred so as to fill in the particular area to which the optical diffraction structure is not transferred. The particular area may have a linear shape. Therefore, because the width of the particular area is narrow and the particular area has a gap-like shape, the confirmation of the existence of the particular area becomes more difficult when the ink layer is transparent in the visible light. Furthermore, when the particular area is formed in the character shape, the character information can be added in addition to the existence of the stealth ink, then the higher degree of security can be provided.

A second recorded matter of the invention is realized by a recorded matter having an image, wherein an ink layer including an invisible ink portion is provided in a particular area in the image, the invisible ink portion being formed with ink which is invisible in visible light, and an optical diffraction structure layer including an optical diffraction structure is provided so as to avoid the particular area.

In order to solve the above problems, a third image forming method of the invention is an image forming method for forming an image including an optical diffraction structure, the image forming method comprising a process of thermally transferring a transfer layer to a transfer object while a thermal transfer sheet is opposed to the transfer object to leave a release layer on a surface of the transfer layer, the thermal transfer sheet having the transfer layer including the release layer being laminated on a base material sheet, a mold releasing agent being not contained in the release layer; and a process of transferring an optical diffraction structure layer onto the release layer left on the surface of the transfer layer, the optical diffraction structure layer being provided in an optical diffraction structure transfer sheet.

The present inventor focuses on the fact that the reason why the optical diffraction structure does not adhere to the portion printed performed by the thermal transfer is that the surface of the portion contains the mold releasing agent. According to the third image forming method of the invention, in the thermal transfer sheet, the base material sheet side and the transfer layer are separated at the release layer, and the transfer layer is thermally transferred to the transfer object so that the release layer is left on the surface which does not substantially contain the mold releasing agent such as wax, silicone, and a surface active agent. Therefore, the outermost surface of the transfer layer on the transfer object becomes the release layer which does not contain the mold releasing agent. Accordingly, the optical diffraction structure layer can adhere to the release layer, and the optical diffraction structure layer can be further transferred onto the transfer layer thermally transferred onto the transfer object.

"Release layer" is a generic term of a layer included in the transfer layer which is located at a position where the transfer layer is separated from the base material sheet side at the moment of the thermal transfer. Accordingly, the release layer may be a layer having not only the separation function but also another function. "So that the release layer is left" includes the case in which the release layer in the thermal transfer sheet is separated from the base material sheet side to the transfer object in the state of being contained in the transfer layer as it is and the case in which the release layer is separated from the base material sheet side in the middle of the release layer in the sate of leaving a part of the release layer on the base material sheet side.

"Transfer layer" includes the case of only the release layer and the case in which another layer is laminated in addition to the release layer. "Optical diffraction structure" includes the diffraction grating in which a convexconcave pattern is simply repeated and the so-called hologram in which interference fringe expressing a predetermined shape is formed.

In the transfer layer, an ink layer containing ink may further be laminated on the release layer, and the transfer layer may thermally be transferred so as to form a particular shape on the transfer object in the thermal transfer process. Therefore, a special meaning can be imparted to the particular shape formed by the transfer layer on the transfer object, and the shape can be used as the information. Particularly, with the ink which is visible in the visible light, a user can recognize the particular shape. The shape is formed by the thermal transfer method, so that the shape to be formed can be changed if needed. "Particular shape" means a shape which is visible, including such as a symbol, a character, and a pattern.

The optical diffraction structure may be transferred to a part of the transfer layer transferred on the transfer object in the process of transferring the optical diffraction structure layer. Therefore, because the transfer layer transferred onto the transfer object is not completely concealed, the transferred transfer layer is visible even if the transfer layer is not transparent.

A third recorded matter of the invention is realized by a recorded matter having an image, wherein the image has a thermal transfer portion formed by thermal transfer and an optical diffraction structure laminated on the thermal transfer portion, and a mold releasing agent is not contained in a surface of the thermal transfer portion having contact with the optical diffraction structure.

EFFECT OF THE INVENTION

As described above, according to the invention, the optical diffraction structure provided in the optical diffraction structure transfer sheet is transferred so that information indicating the predetermined regularity in the corresponding relationship to information already recorded on the transfer object is formed. Therefore, the invention can provide the method and the like for producing the recorded matter which utilize the optical diffraction structure to realize the higher degree of security for preventing the forgery and falsification of the information.

The optical diffraction structure layer is transferred while avoiding the particular area of the transfer object, and the ink layer having the invisible ink portion formed by ink which is invisible in the visible light is transferred to the particular area. Therefore, the present invention can provide the method and the like for forming an image having the optical diffraction structure which provides the high degree of security that can hardly be copied at a glance in the visible light.

Furthermore, by using the thermal transfer sheet in which the transfer layer including a releasing layer which does not contain the mold releasing agent is laminated on the base material sheet, the optical diffraction structure can be provided even on the portion formed previously on the transfer object by the thermal transfer method.

BEST MODE FOR CARRYING OUT THE INVENTION

1. First Mode

Figure 1:
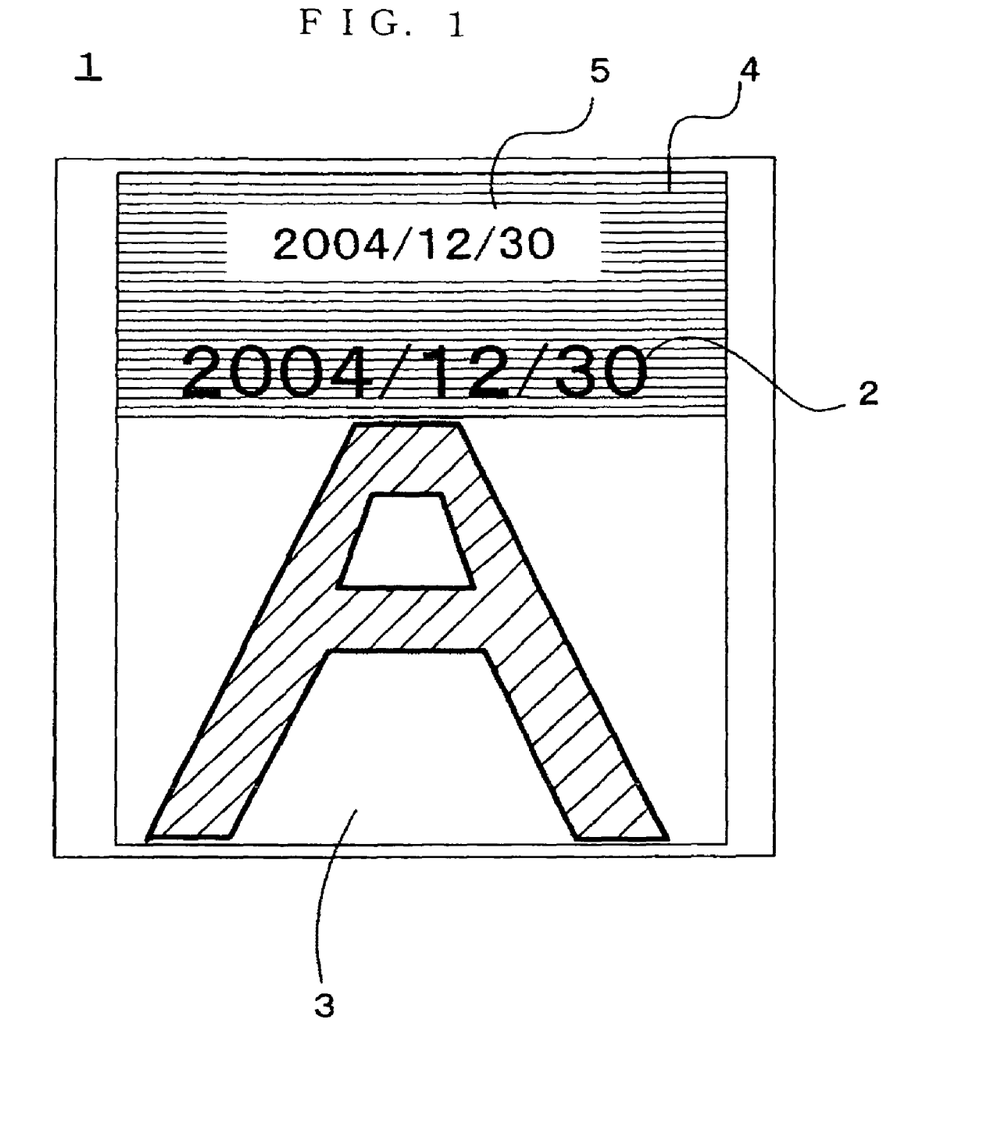
FIG. 1 is a view showing an image of a recorded matter formed in a first mode.

FIG. 1 is a view showing a sticker which is of a recorded matter 1 having an image formed in a first mode. The recorded matter 1 includes a print information portion 2, a hologram portion 3, a diffraction grating portion 4, and diffraction grating information portion 5. A date as recorded information is printed in the print information portion 2. A three-dimensional hologram is made in a shape of "A" in the hologram portion 3. A lateral stripe diffraction grating is provided to the diffraction grating portion 4. The same date as the print information portion 2 is formed by the diffraction grating in the diffraction grating information portion 5. Then, a method of forming the image of the recorded matter 1 will be described.

Figure 2:
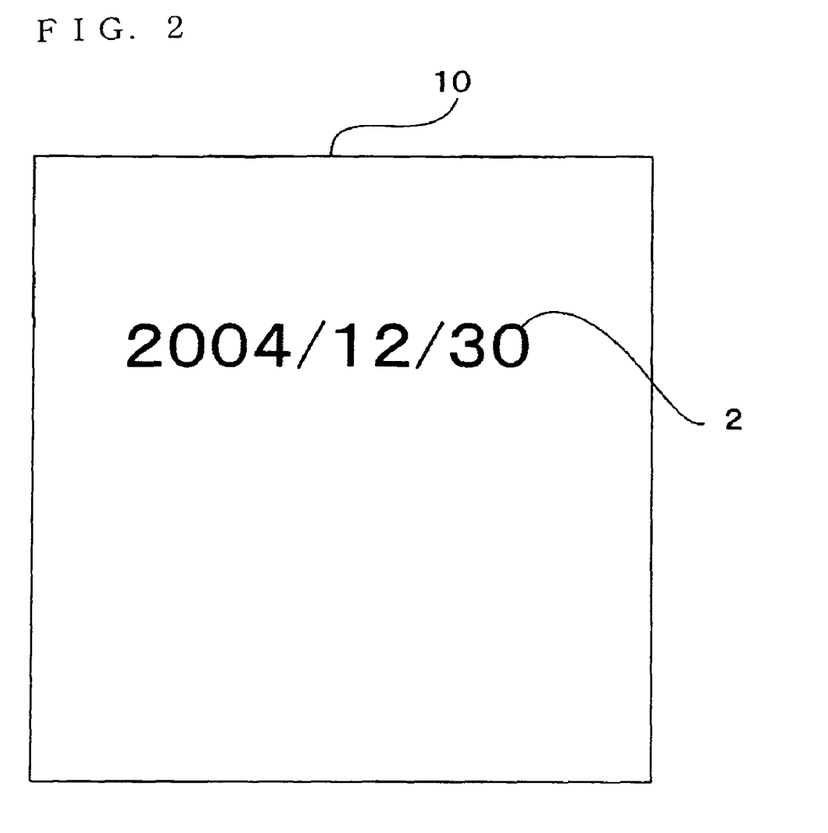
FIG. 2 is a view showing a surface of a transfer object used to form the image shown in FIG. 1.
Figure 3:
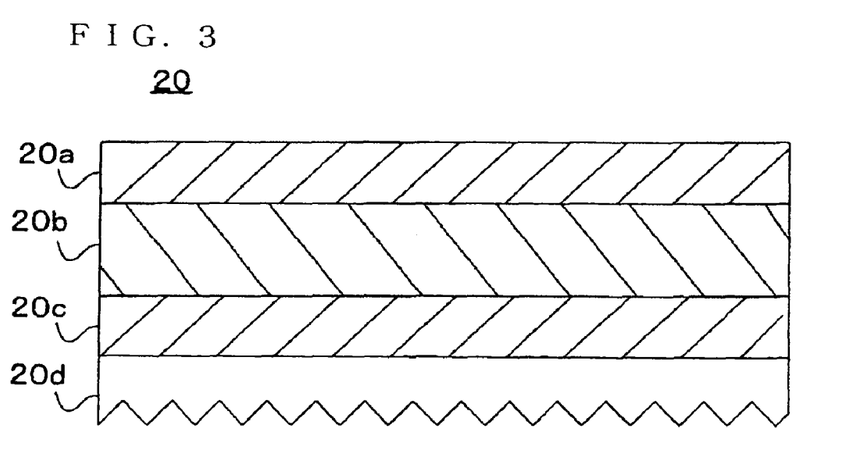
FIG. 3 is a sectional view showing an optical diffraction structure transfer sheet used to form the image shown in FIG. 1.
Figure 4:
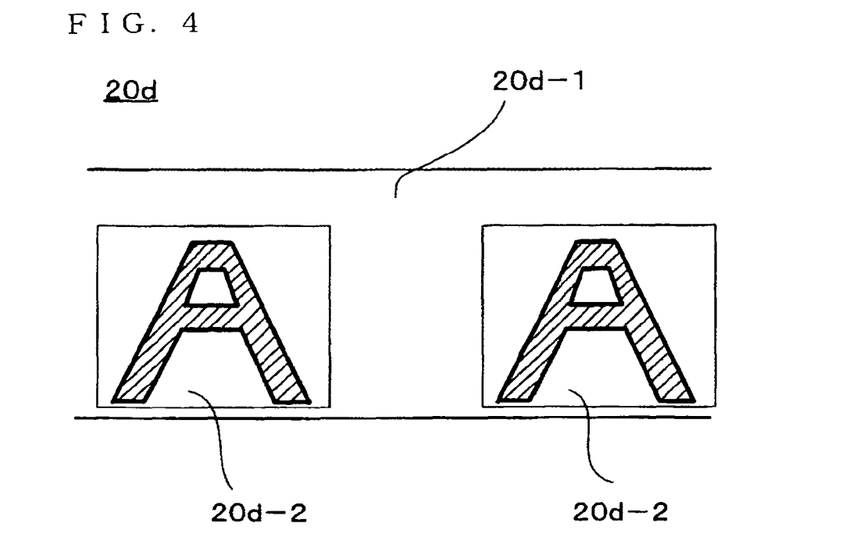
FIG. 4 is a view showing an optical diffraction structure forming layer of the optical diffraction structure transfer sheet shown in FIG. 3.

As shown in FIG. 2, the print information portion 2 is already provided in a transfer object 10 in the first mode. An optical diffraction structure provided in an optical diffraction structure transfer sheet is thermally transferred to the transfer object 10 to form the image of the recorded matter 1 using a thermal head. FIGS. 3 and 4 show a structure of an optical diffraction structure transfer sheet 20 in the first mode. As shown in FIG. 3, the optical diffraction structure transfer sheet 20 is formed by laminating a back-face lubricant layer 20a, a base material sheet 20b, a release layer 20c, and an optical diffraction structure forming layer 20d in order from the side on which the thermal head comes into contact with the optical diffraction structure transfer sheet 20.

The optical diffraction structure in the invention shall mean a diffraction grating or a hologram, and the optical diffraction structure is formed in the optical diffraction structure forming layer 20d. As shown in FIG. 4, the optical diffraction structure forming layer 20d is formed by a diffraction grating foil 20d-1 as a whole. In the optical diffraction structure forming layer 20d, the hologram portions 20d-2 indicating the shape of "A" formed by the 3D computer hologram is made are provided at constant intervals. The diffraction grating foil 20d-1 and the hologram portion 20d-2 are transferred to the transfer object 10 to form the hologram portion 3 or diffraction grating information portion 5 of the recorded matter 1 by the later-mentioned method.

An interference fringe of the hologram and the diffraction grating to form the optical diffraction structure forming layer 20d may be the one recorded as relief having convexconcave pattern on the surface thereof, the one stereoscopically recorded in a thickness direction, or the one recorded such that the diffraction is generated by the change in amplitude of light depending on the change in transmittance. Specifically, examples of the interference fringe include a laser reproducing hologram such as a Fresnel hologram and an image hologram, white light reproducing hologram such as a Lippman's hologram and a rainbow hologram, and holographic stereogram and color hologram in which these principles are utilized.

These holograms can be produced by the conventional method and formed as the optical diffraction structure forming layer 20d. The optical diffraction structure forming layer 20d has an adhesion property for adhering to the transfer object 10. The material which generates the adhesion property may be appropriately determined according to the material constituting the surface of the transfer object 10. When the material constituting the optical diffraction structure forming layer 20d is transferred to the transfer object 10, the print information 2 is printed with the size (dot) so as not to be completely concealed. Therefore, the material does not completely conceal the print information 2.

The back-face lubricant layer 20a is provided to prevent a so-called sticking phenomenon caused by heating. Accordingly, it is necessary that the back-face lubricant layer 20a have high heat-resistant property and heat sliding property. The release layer 20c is provided to enhance a release property between the optical diffraction structure forming layer 20d and the base material sheet 20b. The material used for the release layer 20c may be appropriately determined according to the base material sheet 20b. It is necessary that the base material sheet 20b have rigidity and the heat-resistant property to some extent. It is preferable that whole of the optical diffraction structure transfer sheet 20 has the thickness to an extent in which heat transfer from the thermal head is not obstructed.

the side of the optical diffraction structure forming layer 20d of the optical diffraction structure transfer sheet 20 having the above configuration and the surface of the transfer object 10 are overlapped with each other, and the heat is applied from the side of the back-face lubricant layer 20a by using the thermal head. The release layer 20c corresponding to the heated portion is released from the base material sheet 20b, and the optical diffraction structure forming layer 20d is transferred to the transfer object 10. That is, the optical diffraction structure forming layer 20d corresponding to the position heated by the thermal head is transferred to the transfer object 10. Accordingly, the optical diffraction structure forming layer 20d having a predetermined area corresponding to the heating position of the thermal head is transferred when the predetermined area is evenly heated to the back-face lubricant layer 20a, and the optical diffraction structure forming layer 20d is transferred such that a predetermined shape corresponding to the heating position is drawn when the heat is applied so as to draw the predetermined shape.

Figure 5:
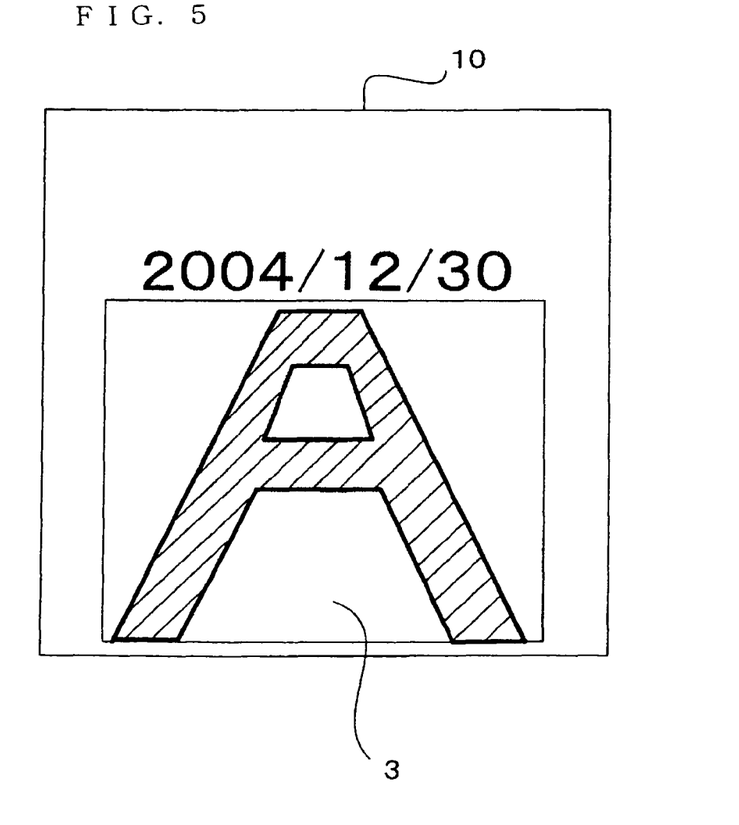
FIG. 5 is a view showing a state in which a hologram portion is transferred to the transfer object shown in FIG. 2.

In the first mode, a range corresponding to a hologram portion 20d-2 is evenly heated from the back-face lubricant layer 20a by the thermal head. Therefore, the optical diffraction structure forming layer 20d corresponding to the hologram portion 20d-2 is transferred to the transfer object 10 to form the hologram portion 3. FIG. 5 shows this state. In this case, the range corresponding to the hologram portion 20d-2 may be heated by evenly moving the one thermal head, or the range may be heated at once by the thermal head having plural heat elements.

Then, the optical diffraction structure transfer sheet 20 is located such that a diffraction grating foil 20d-1 of the optical diffraction structure forming layer 20d is overlapped with the portion corresponding to the diffraction grating portion 4 and diffraction grating information portion 5 in the transfer object 10. The heat is applied in the stripe shape from the side of the back-face lubricant layer 20a of the optical diffraction structure transfer sheet 20 by moving the thermal head, and thereby the diffraction grating foil 20d-1 of the optical diffraction structure forming layer 20d is transferred in the lateral stripe shape to form the diffraction grating portion 4. Then, the thermal head is moved such that the same date as the date shown in the print information portion 2 is transferred. As described above, because only the optical diffraction structure forming layer 20d corresponding to the heated portion is transferred, the diffraction grating information portion 5 is formed to represent the same date as the date shown in the print information portion 2 by the diffraction grating. Thus, the recorded matter 1 can be obtained by the above method.

The invention is not limited to the above mode and the invention could be realized in various made. For example, any color may be used for the information in the print information portion 2. The printing may be performed with ink which cannot be recognized in visible light. The printed information is not limited to the date, but a character, a symbol, a graphic, a pattern, and the like may be used as the printed information as appropriate. A method of recording the information recorded in the transfer object 10 is not limited to the printing, and application, etching, and the like can be used.

In the first mode, the hologram portion 3, the diffraction grating portion 4, and the diffraction grating information portion 5 are sequentially formed. However, the order is not limited in forming the hologram portion 3, the diffraction grating portion 4, and the diffraction grating information portion 5. The recorded matter 1 may be used for various applications such as a sticker, a card, and a cash voucher as long as the recorded matter 1 includes information recorded by the method except for the optical diffraction structure and information recorded by the optical diffraction structure. In the first mode, the diffraction grating information portion 5 is transferred to the transfer object 10 in which the print information 2 has been already printed. However, as long as the print information 2 is printed on the transfer object before the diffraction grating information portion 5 is printed, for example, the print information 2 may be printed to the transfer object in which the print information 2 is not printed and then the diffraction grating information portion 5 is provided by the same machine. The diffraction grating information portion 5 may be formed not only by the so-called diffraction grating but by the hologram.

In the optical diffraction structure transfer sheet 20, an adhesion layer having a high adhesion property to the transfer object 10 maybe provided on the side opposite to the release layer 20c of the optical diffraction structure forming layer 20d. When the base material sheet 20b has the release property, it is not necessary to provide the release layer. When the base material sheet 20 has the high slide property to sufficiently move the heating position, it is not necessary to provide the back-face lubricant layer 20a. A visible light blocking layer which blocks the visible light may be provided in the optical diffraction structure transfer sheet 20 and transferred to the transfer object 10 together with the optical diffraction structure forming layer 20d. Thereby, the information recorded below the position where the optical diffraction structure forming layer 20d is transferred is invisible in the visible light, but the information is visible only with, e.g., an ultraviolet ray. Accordingly, the degree of security can be enhanced. Additionally, a layer which enhances diffraction efficiency and the like can be laminated appropriately on the optical diffraction structure transfer sheet 20 as long as the invention can be realized.

The heating method is not limited to the heating with the thermal head, and any heating method may be used as long as the optical diffraction structure forming layer 20d can be transferred in the linear shape and in the plane shape. For example, heat generated by a laser beam may be utilized. In this case, the back-face lubricant layer 20a is not required in the optical diffraction structure transfer sheet 20, and it is desirable that an opto-thermal conversion agent be contained in any layer or it is desirable that an opto-thermal conversion layer be provided instead.

2. Second Mode

Figure 6:
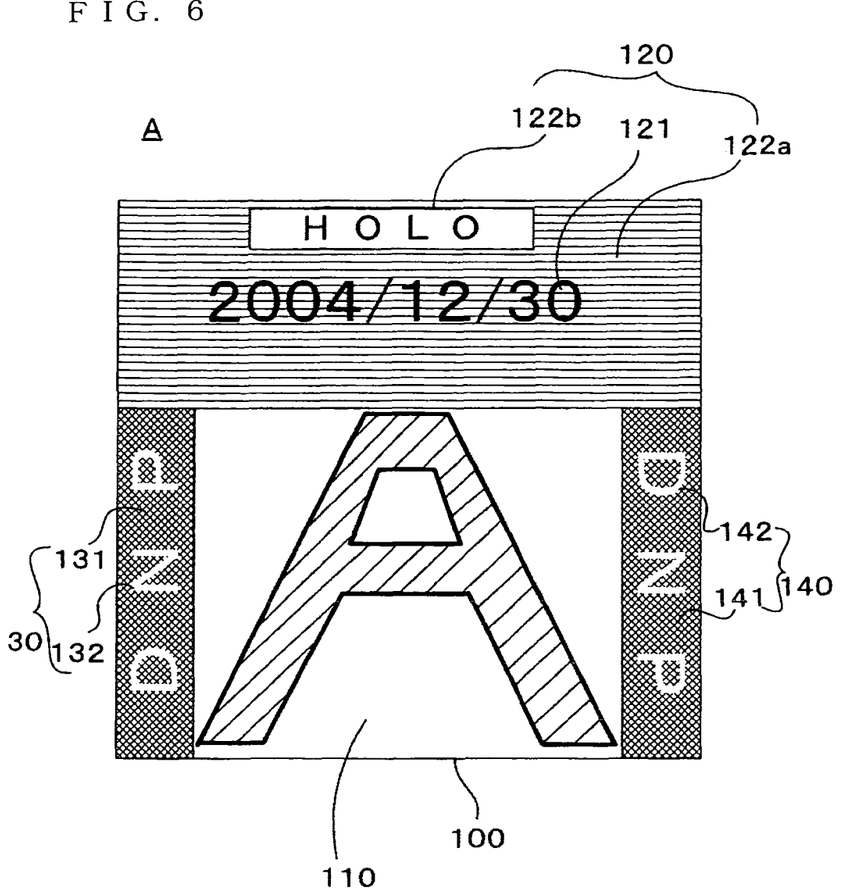
FIG. 6 is a view showing a recorded matter having an image formed in a second mode.

FIG. 6 shows a recorded matter A in which a final image 100 is provided. The final image 100 has the optical diffraction structure finally obtained by the image forming method in the second mode. Any mode such as a sticker, a card, and a banknote can be employed as the recorded matter A. In the recorded matter A of the second mode, the final image 100 is provided in one of surfaces of the transfer object or in both surfaces of the transfer object.

The final image 100 includes a hologram transfer portion 110, a first diffraction grating transfer portion 120, a second diffraction grating transfer portion 130, and a third diffraction grating transfer portion 140. The computer hologram is made in the shape of "A" for the hologram transfer portion 110. The first diffraction grating transfer portion 120 includes a thermal transfer information portion 121, a lateral stripe transfer portion 122a, and a character transfer portion 122b. Characters in the thermal transfer information portion 121 are printed by thermal transfer, the diffraction grating in the lateral stripe transfer portion 122a is transferred in the lateral stripe, and the diffraction grating in the character transfer portion 122b is transferred in the character shape. The second diffraction grating transfer portion 130 includes a transfer portion 131 and a non-transfer portion 132. The diffraction grating is transferred to the transfer portion 131, and the diffraction grating is not transferred in the character shape to the non-transfer portion 132. Similarly to the second diffraction grating transfer portion 130, the third diffraction grating transfer portion 140 includes a transfer portion 141 and a non-transfer portion 142. Because the configuration and forming method of the third diffraction grating transfer portion 140 are similar to those of the second diffraction grating transfer portion 130, the descriptions of the configuration and forming method for the third diffraction grating transfer portion 130 will be omitted.

Figure 7A:
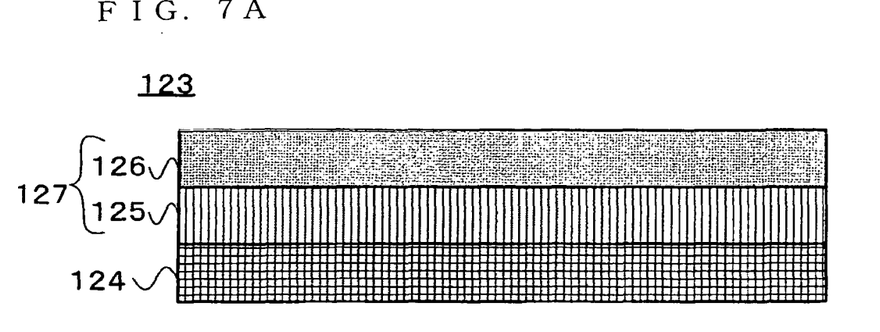
FIG. 7A is a sectional view of a thermal transfer sheet used to obtain the final image shown in FIG. 6.

In the second mode, the final image 100 is formed by heating, as described later, each thermal transfer sheet shown in FIGS. 7A to 7C using the thermal head of a thermal transfer printer. In the following descriptions of the second mode, by way of example, a sheet in which the hologram can further be transferred onto a pattern printed by the thermal transfer is referred to as a visible transfer sheet, and a sheet in which the hologram cannot be transferred onto the pattern is referred to as an invisible transfer sheet. However, a visible part and an invisible part are not limited to the above situation. A transfer layer 127 is laminated on a base material sheet 124 in a thermal transfer sheet 123 shown in FIG. 7A, and the transfer layer 127 includes a release layer 125 and a visible ink layer 126. The thermal transfer sheet 123 is used to form the thermal transfer information portion 121. The release layer 125 and the base material sheet 124 are separated from each other, and the transfer layer 127 is thermally transferred to the transfer object. The visible ink layer 126 is formed by ink which is visible in the visible light. The release layer 125 is provided to enhance the release property between the base material sheet 124 and the visible ink layer 126, but the mold releasing agent is not included in the release layer 125. Therefore, the visible ink layer 126 has the sufficient adhesion property to the transfer object. Hereinafter, the thermal transfer sheet 123 is referred to as a visible transfer sheet 123.

Figure 7B:
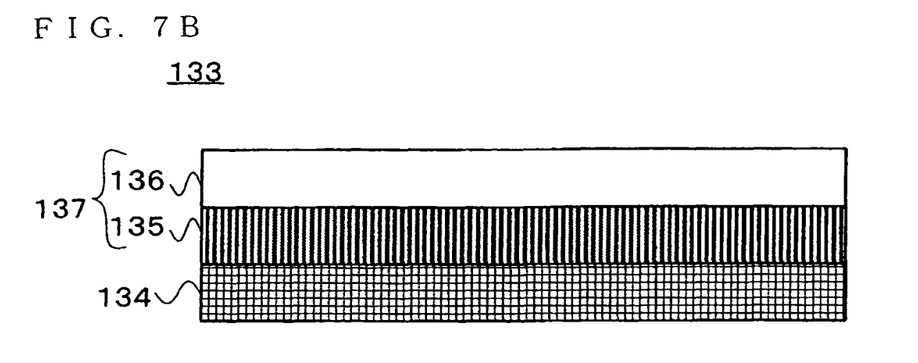
FIG. 7B is a sectional view of a thermal transfer sheet used to obtain the final image shown in FIG. 6.

A transfer layer 137 is laminated on a base material sheet 134 in a thermal transfer sheet 133 shown in FIG. 7B, and the transfer layer 137 includes a release layer 135 and an invisible ink layer 136. The thermal transfer sheet 133 is used to form the non-transfer portions 132 and 142. The invisible ink layer 136 is formed by so-called stealth ink which is invisible in the visible light. The release layer 135 is transparent in the visible light, and the mold releasing agent is included in the release layer 135. Hereinafter, the thermal transfer sheet 133 is referred to as an invisible transfer sheet 133. Each Layer 134, 135, and 136 constituting the invisible transfer sheet 133 will be described in detail.

The invisible ink layer 136 is formed by a binder resin and a fluorescent agent. Either inorganic fluorescent dye or organic fluorescent dye may be used as the fluorescent agent. The invisible ink layer 136 can be formed by applying ink to which the fluorescent agent, the binder resin, other additives, and the like by a publicly known application means such as gravure coating.

For the organic fluorescent dye used in the invention, preferably the organic fluorescent dye is dissolved in the binder resin and the organic fluorescent dye is colorless at ordinary temperature. Examples of the organic fluorescent dye include a diamino stilbene disulfonic acid derivative, an imidazole derivative, a coumarin derivative, triazole, carbazole, pyridine, naphthalic acid, and imidazolone derivatives, dye such as fluorescein and eosin, and a compound such as anthracene having a benzene ring. Specifically, examples of the colorless fluorescent dye in the visible light include EB-501 (product of Mitsui Chemical, Inc., luminescent color: blue), EG-302 (product of Mitsui Chemical, Inc., luminescent color: yellow-green), EG-307 (product of Mitsui Chemical, Inc., luminescent color: green), ER-120 (product of Mitsui Chemical, Inc., luminescent color: red), ER-122 (product of Mitsui Chemical, Inc., luminescent color: red), UVITEX OB (product of Ciba-Geigy K.K., luminescent color: blue) called fluorescent brightening agent, and Europium-Thenoyltrifluoroacetonechelate (product of SINLOIHI CO., LTD.: red orange).

An addition amount of organic fluorescent dye to the invisible ink layer 136 may arbitrarily determined according to needs of performance, and there is no particular restriction. However, in the case where compatibility is not so high between the organic fluorescent dye and the binder resin, there is a trouble that fluorescent dye is deposited in the layer when a compounding ratio of the organic fluorescent dye is excessively increased. Therefore, preferably the compounding ratio of the fluorescent dye to the whole of the invisible ink layer ranges from about 0.01 to about 50% by weight, and more preferably the compounding ratio ranges from about 0.1 to about 20% by weight.

Pigment can be used as the inorganic fluorescent dye. The pigment mainly including crystals such as Ca, Ba, Mg, Zn, and Cd oxides, sulfide, silicate, phosphate, and tungstate is obtained by the burning while metal elements such as Mn, Zn, Ag, Cu, Sb, and Pb or rare-earth elements such as lanthanoids are added as an active agent. Specifically, examples of the inorganic fluorescent dye include ZnO:Zn, Br(PO)Cl:Eu, ZnGcO:Mn, YO:Eu, Y(P,V)O:Bu, YOSi:Eu, ZnGcO:Mn, and fine particles containing rare-earth elements in which infrared ray is absorbed to perform up-conversion luminescence.

A usage ratio of the binder resin and the inorganic fluorescent dye is changed depending on the type of employed inorganic fluorescent dye. However, generally a weight ratio of resin/inorganic fluorescent dye ranges from 1/0.5 to 1/20, preferably the weight ratio ranges from 1/5 to 1/10. When the usage amount of fluorescent material is excessively small, the formed layer has the insufficient luminescent property, and a foil releasing property is not sufficient at the moment of transfer by the thermal head or the like. On the other hand, when the usage amount of fluorescent material is excessively large, a coating film forming property gets worse.

Examples of the binder resin include cellulose resins such as ethylcellulouse, ethylhydroxycellulose, hydroxypropylcellulose, methylcellulose, and cellulose acetate, vinyl resins such as polyvinyl alcohol, polyvinyl acetate, polyvinyl butyral, polyvinyl acetal, and polyvinyl pyrolidone, acryl resins such as poly(meth)acrylate and poly(meth)acrylamide, polyurethane resins, polyamide resins, polyester resins, and resin mixtures thereof. Polyvinyl butyral and polyvinyl acetal are suitable to the binder resin because polyvinyl butyral and polyvinyl acetal have a good transfer property of the fluorescent dye and good storage stability in the transfer film. Preferably the thickness of the invisible ink layer 136 is formed in the range of 0.1 to 5.0 g/m$^2$.

The release layer 135 is provided to facilitate the releasing of the invisible ink layer 136 from the base material sheet 134. Examples of the resin used as the release layer 135 include acryl resins, urethane resins, resins obtained by silicon-denaturing each of acryl resin and urethane resin, polyvinyl acetal resins, polyvinyl alcohol resins, and mixtures thereof. A coating solution is produced by dissolving the resins in a solvent, and the coating solution is applied and dried to form the release layer 135. The thickness of the release layer 135 ranges from about 0.1 to about 5.0 μm.

It is necessary that the base material sheet 134 have the heat-resistant property against the heat during the transfer, strength to some extent, and dimensional stability. For example, paper, coated paper, plastic film can be employed as the base material sheet 134. Examples of the plastic film include polyester such as polyethylene terephthalate, polystyrene, polypropylene, polysulfone, polyphenylene sulfide, polyethylene naphthalate, 1,4-polycylrohexirene dimethyl terephthalate, aramid, polycarbonate, polyvinyl alcohol, and cellophane. Preferably the thickness of the heat-resistant base material film 2 ranges from 0.5 to 50 μm, and more preferably the thickness ranges from 3 to 10 μm. Polyethylene terephthalate is suitable to the heat-resistant base material film 2.

Figure 7C:
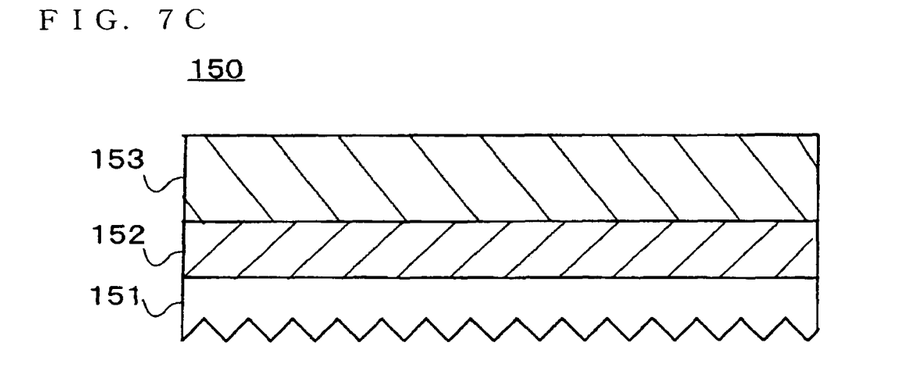
FIG. 7C is a sectional view of a thermal transfer sheet used to obtain the final image shown in FIG. 6.

A thermal transfer sheet 150 shown in FIG. 7C is used to form the hologram transfer portion 110, the lateral stripe transfer portion 122a, the character transfer portion 122b and the transfer portions 131 and 141. In the thermal transfer sheet 150, a hologram layer 151 as an optical diffraction structure layer, a release layer 152, and a base material sheet 153 are sequentially laminated. Hereinafter the thermal transfer sheet 150 is referred to as optical diffraction structure transfer sheet 150.

Figure 8:
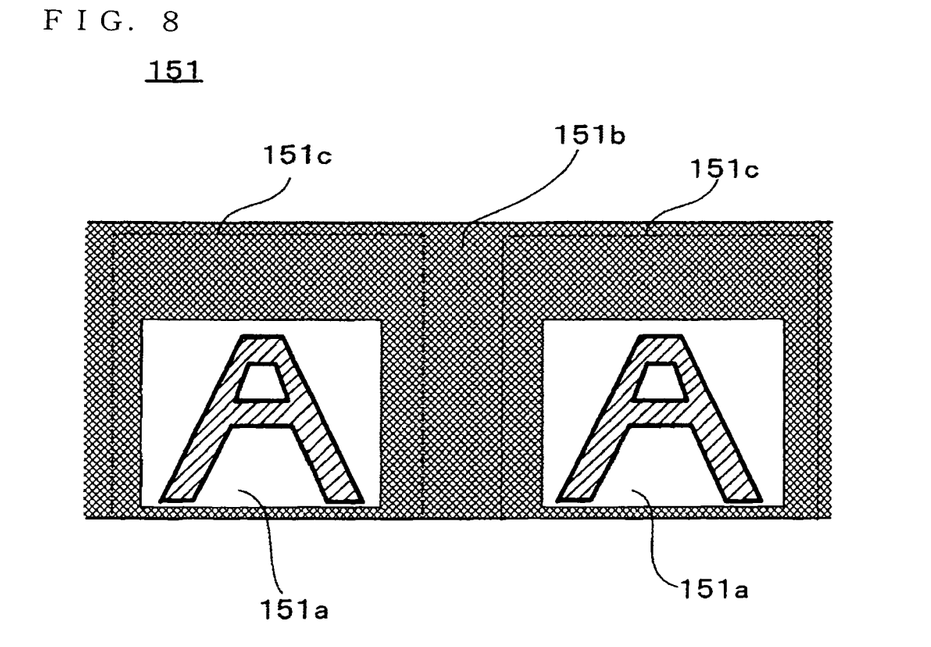
FIG. 8 is a view showing a hologram layer of the optical diffraction structure transfer sheet shown in FIG. 7C.

As shown in FIG. 8, in the hologram layer 151, hologram portions 151a including the character of "A" formed by the computer hologram are provided at constant intervals, and a diffraction grating portion 151 formed by the diffraction grating are provided in the surroundings of the hologram portions 151a. The hologram portion 151a forms the hologram transfer portion 110 by the thermal transfer. The diffraction grating portion 151b forms the lateral stripe transfer portion 122a, the character transfer portion 122b, and the transfer portions 131 and 141 by the thermal transfer. A range indicated by a dotted line 151c shows a size of the final image 100. The dotted line 151c is indicated only for the purpose of explanation, and actually the dotted line 151c is not drawn in the hologram layer 151.

It does not matter which an interference fringe recorded as a relief having convex-concave patterns on the surface, an interference fringe recorded stereoscopically in a thickness direction, or an interference fringe recorded such that the diffraction caused by the change in amplitude of light is generated by the change in transmittance may be used as an interference fringe of the hologram portion 151a and the diffraction grating portion 151b. Specifically, examples of the interference fringe include a laser reproducing hologram such as a Fresnel hologram and an image hologram, white light reproducing hologram such as a Lippman's hologram and a rainbow hologram, holographic stereogram in which these principles are utilized, and a color hologram.

These holograms can be produced by the conventional method so as to form the hologram layer 151 shown in FIG. 8. When the material constituting the hologram layer 151 is transferred to the transfer object, the material is printed with the size (dot), a hatching dot pattern, or a combination thereof such that the information located below the material is not completely concealed. Therefore, the material constituting the hologram layer 151 is not always transparent.

The release layer 152 is provided to enhance the release property between the hologram layer 151 and the base material sheet 153. The material used for the release layer 152 may be appropriately determined depending on the base material sheet 153. The base material sheets 124 and 153 of the thermal transfer sheets 123 and 150 are sufficient when the base material sheets 124 and 153 have the rigidity and heat-resistant property to some extent. The total thickness of each of the thermal transfer sheets 123, 133, and 150 is sufficient until the heat transfer from the thermal head is not obstructed.

Figure 9A:
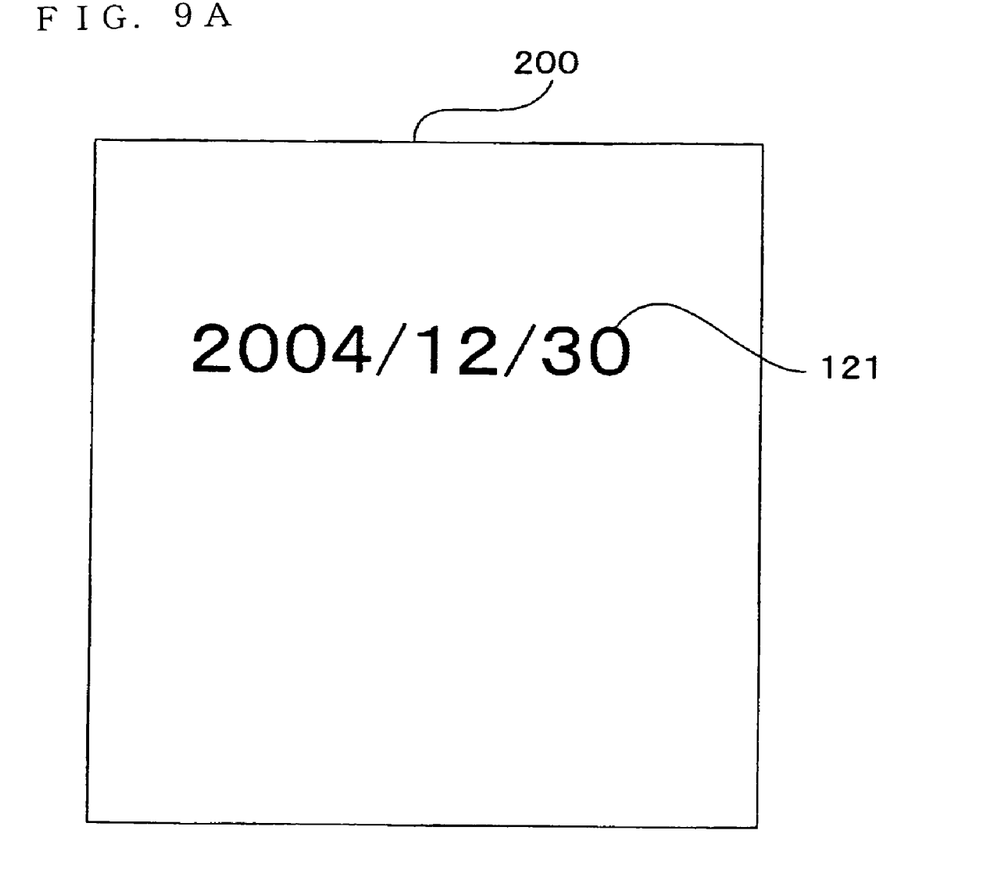
FIG. 9A is a view showing a transfer object on which a thermal transfer information portion is formed.

The method of forming the final image 1 with the thermal transfer sheets 123, 133, and 150 will sequentially be described below. First the thermal transfer information portion 121 indicated by date information of "Dec. 12, 2004" as a particular shape as shown in FIG. 9A is formed on the transfer object 200 using the visible transfer sheet 123. The visible transfer sheet 123 is opposed to the surface of the transfer object 200 such that the visible ink layer 126 of the visible transfer sheet 123 is overlapped with the transfer object 200, the thermal head is brought into contact with the visible transfer sheet 123 from side of the base material sheet 124, and the heating position is moved such that the date information is formed on the transfer object 200. The transfer object 200 may appropriately be determined according to the finally obtained recorded matter.

Figure 9B:
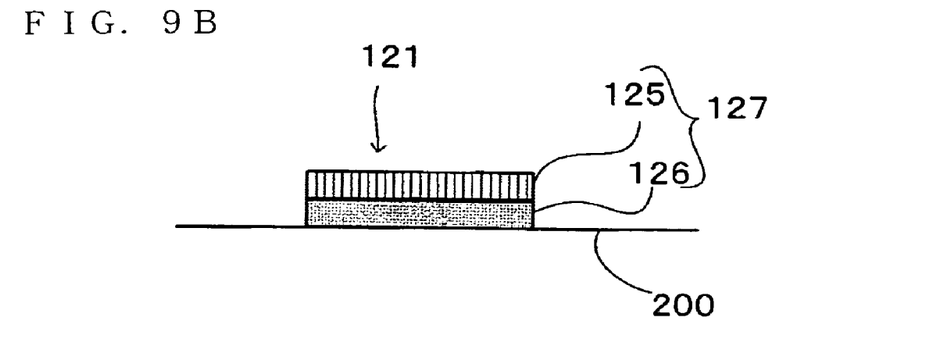
FIG. 9B is a sectional view showing the thermal transfer information portion formed on the transfer object.

Therefore, the release layer 125 and visible ink layer 126 which are the transfer layer 127 are separated from the base material sheet 124, and the release layer 125 and visible ink layer 126 are transferred to the surface of the transfer object 200 so as to form the date information. Because the visible transfer sheet 123 is separated from the release layer 125 when the visible transfer sheet 123 is heated, as shown in FIG. 9B, the release layer 125 which does not include the mold releasing agent becomes the outer-most surface on the transfer object 200. The thermal transfer information portion 121 is formed by the above method.

Figure 10A:
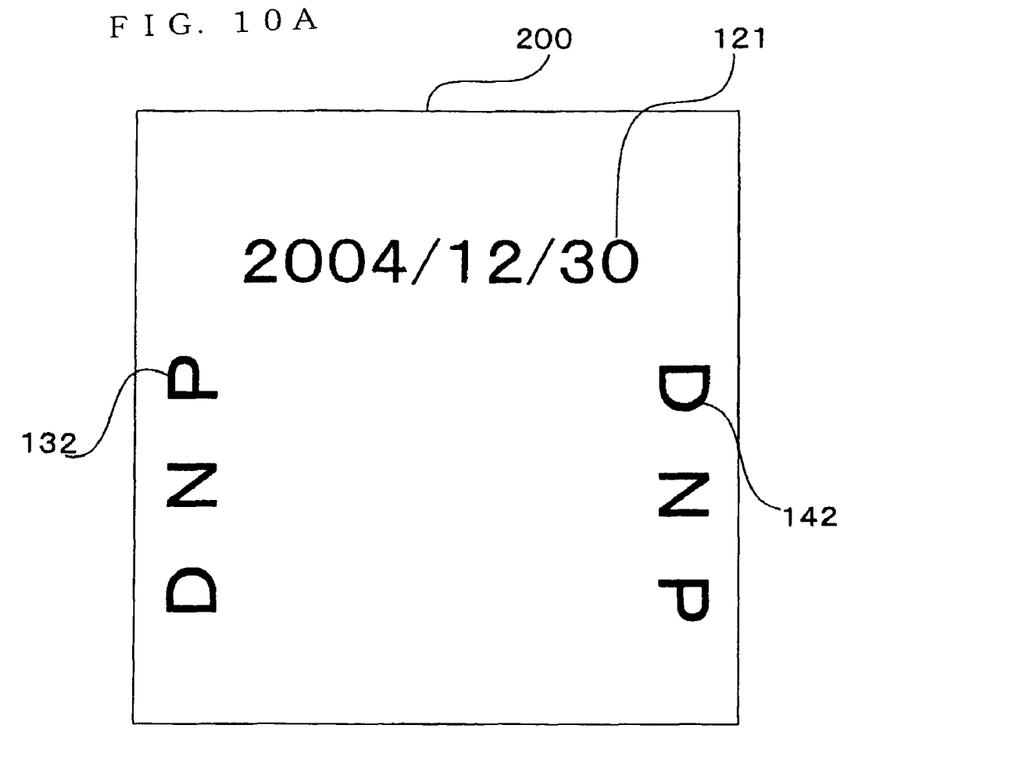
FIG. 10A is a view showing the transfer object in which the thermal transfer information portion and a non-transfer portion are formed.

Then, the non-transfer portion 132 indicated by character information of "DNP" shown in FIG. 10A is formed to the transfer object 200 by using the invisible transfer sheet 133. The invisible transfer sheet 133 is opposed to the surface of the transfer object 200 such that the invisible ink layer 136 of the invisible transfer sheet 133 is overlapped with the transfer object 200. The thermal head is brought into contact with the invisible transfer sheet 133 from side of the base material sheet 134, and the heating position is moved such that the character information is formed on the transfer object 200. Therefore, the release layer 135 and invisible ink layer 136 which are the transfer layer 137 are separated from the base material sheet 134, and the release layer 135 and invisible ink layer 136 are transferred to the surface of the transfer object 200 so as to form the character information.

Figure 10B:
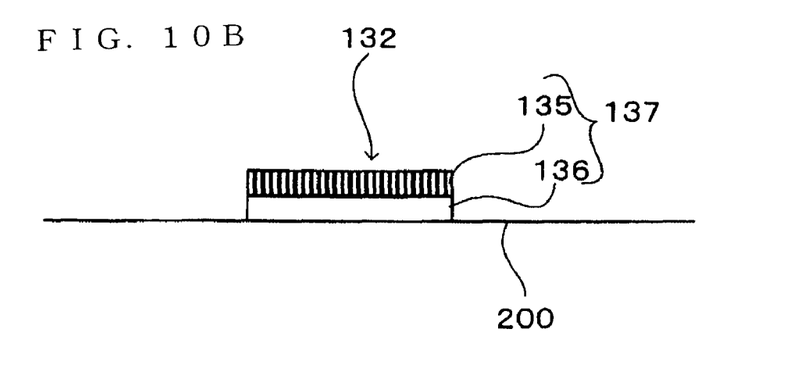
FIG. 10B is a sectional view showing the non-transfer portion formed on the transfer object.

Because the visible transfer sheet 133 is separated from the release layer 135 when the invisible transfer sheet 133 is heated, as shown in FIG. 10B, the release layer 135 which includes the mold releasing agent becomes the outer-most surface on the transfer object 200. The non-transfer portion 132 is formed by the above method. Although the character information of "DNP" of the non-transfer portion 132 in FIG. 10A is indicated in the visible state for the sake of convenience, the release layer 135 is transparent in the visible light, and actually the character information of "DNP" is invisible in the visible light because the invisible ink layer is formed by the stealth ink. The non-transfer portion 142 is also formed in the same manner as the non-transfer portion 132.

Then, the hologram transfer portion 110, the lateral stripe transfer portion 122a, the character transfer portion 122b, and the transfer portions 131, 141 are formed by using the optical diffraction structure transfer sheet 150 to the transfer object 200 in which the thermal transfer information portion 121 and the non-transfer portions 132 and 142 are formed. The hologram layer 151 of the optical diffraction structure transfer sheet 150 is overlapped with the surface of the transfer object 200. The position of the optical diffraction structure transfer sheet 150 is set such that the position of the transferred hologram portion 151a becomes the position where the hologram transfer portion 110 should be formed on the transfer object 200.

Figure 11:
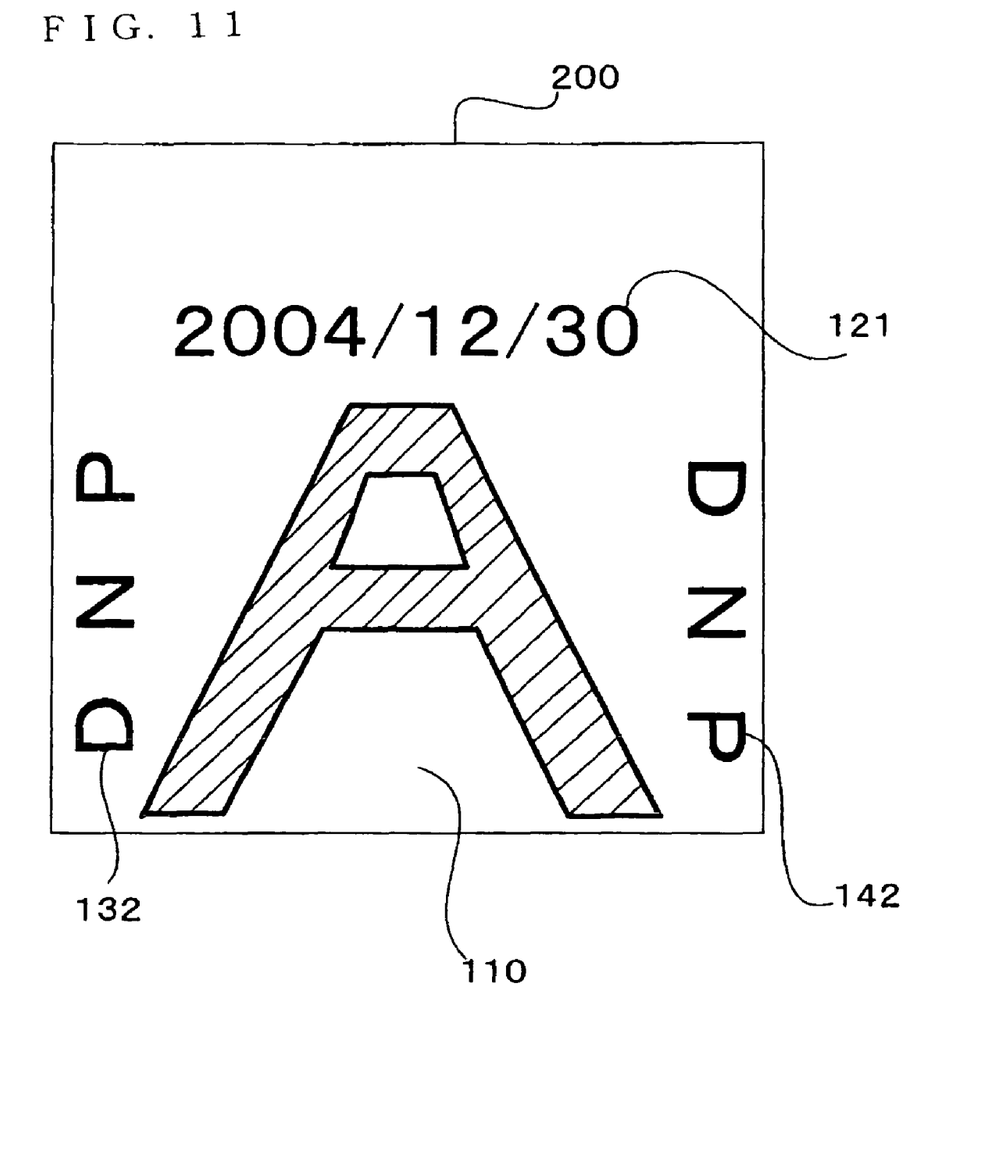
FIG. 11 is a view showing the transfer object in which a hologram portion is formed.

By positioning the optical diffraction structure transfer sheet 150 as mentioned manner, the range indicated by the dotted line 151c of the optical diffraction structure transfer sheet 150 coincides with the range of the final image 100 which should be formed on the transfer object 200. Accordingly, the diffraction grating portion 151b of the optical diffraction structure transfer sheet 150 is overlapped with the range where the lateral stripe transfer portion 122a, the character transfer portion 122b, and the transfer portions 131 and 141 should be formed in the transfer object 200. The thermal head is brought into contact with the optical diffraction structure transfer sheet 150 from side of the base material sheet 153, and the heating position is moved such that the hologram portion 151a is transferred. FIG. 11 shows the transfer object 200 to which the hologram portion 151a is transferred.

Figure 12:
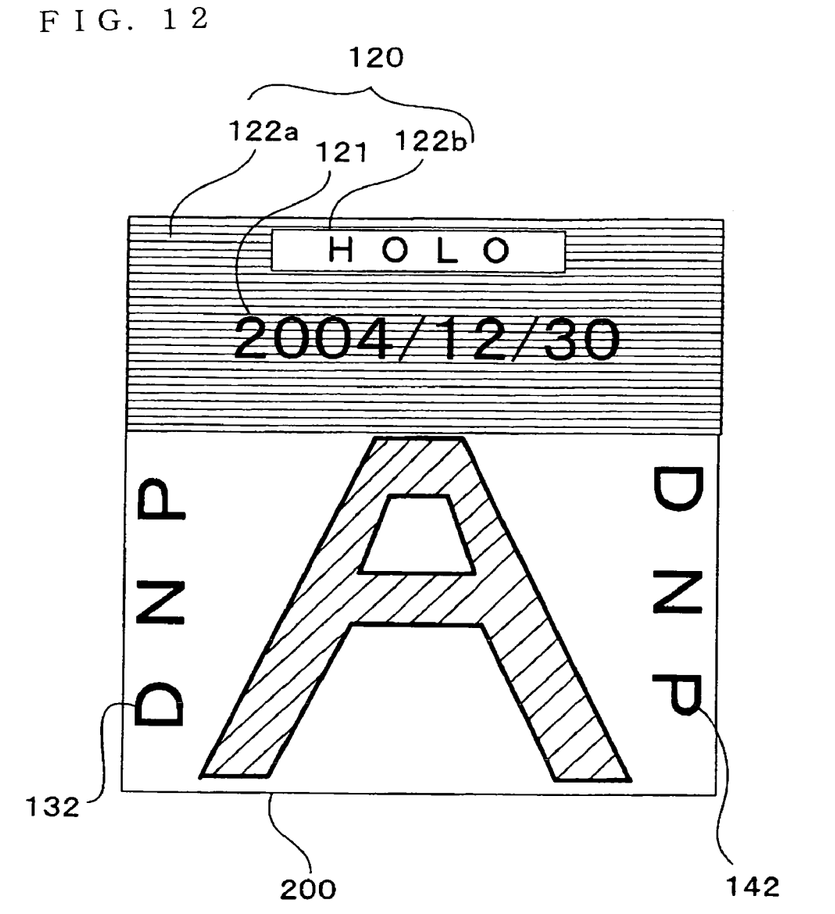
FIG. 12 is a view showing the transfer object in which a second diffraction grating transfer portion is formed.

Then, the lateral stripe transfer portion 122a and the character transfer portion 122b are formed. As described above, because the diffraction grating portion 151b of the optical diffraction structure transfer sheet 150 is overlapped with the range where the lateral stripe transfer portion 122a and the character transfer portion 122b should be formed in the transfer object 200, it is not necessary to move the position of the optical diffraction structure transfer sheet 150. The heating position of the thermal head is moved such that the diffraction grating of the diffraction grating portion 151b is transferred in the lateral stripe in the range where the lateral stripe transfer portion 122a should be formed, and the heating position of the thermal head is moved such that the diffraction grating forms character information of "HOLO" in the range where the character transfer portion 122b should be formed. FIG. 12 shows the state in which the lateral stripe transfer portion 122a and the character transfer portion 122b are formed on the transfer object 200.

Figure 13:
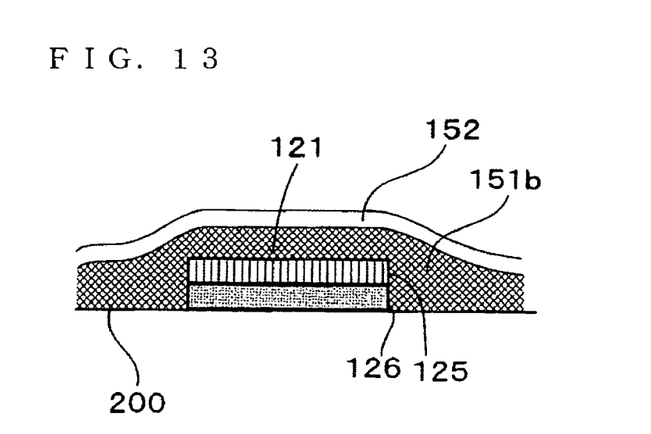
FIG. 13 is a sectional view showing a state in which a diffraction grating is transferred onto the thermal transfer information portion.

As described above, because the release layer 125 of the outermost surface does not contain the mold releasing agent in the thermal transfer information portion 121, the transferred diffraction grating portion 151b is transferred onto the release layer 125 of the thermal transfer information portion 121 as shown in FIG. 13. Accordingly, the diffraction grating portion 151b is also formed in the lateral stripe shape on the thermal transfer information portion 121 which is already formed on the transfer object 200. Thus, the first diffraction grating transfer portion 120 is formed. Because the diffraction grating portion 151b is formed in the lateral stripe shape on the thermal transfer information portion 121, the diffraction grating portion 151b is not transparent, but the thermal transfer information portion 121 is not completely concealed.

Then, the transfer portion 131 is formed. Because of the same reason as the lateral stripe transfer portion 122a and the character transfer portion 122b, it is not necessary to move the position of the optical diffraction structure transfer sheet 150. The heating position of the thermal head is moved such that the diffraction grating of the diffraction grating portion 151b is transferred to the range where the transfer portion 131 should be formed. At this moment, it is not necessary to avoid the transfer of the diffraction grating to the non-transfer portion 132. At the non-transfer portion 132, as described above, because the release layer 135 located on the outermost surface contains the mold releasing agent, the diffraction grating is not transferred onto the non-transfer portion 132.

Figure 14:
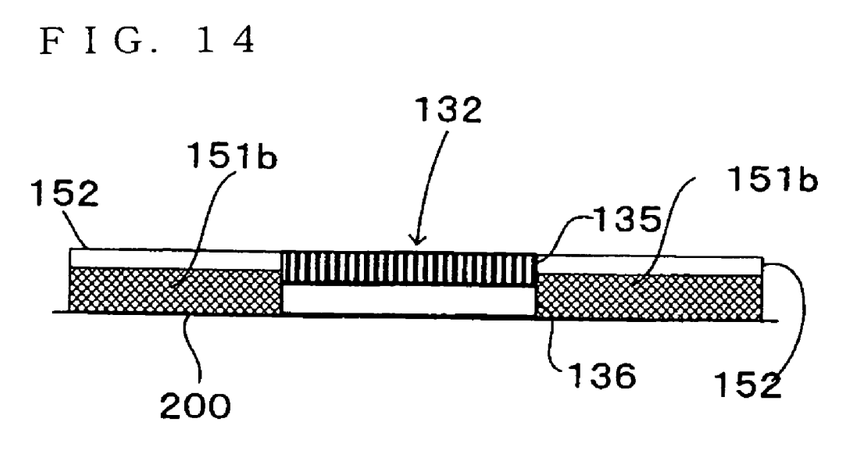
FIG. 14 is a sectional view showing a state in which the diffraction grating is transferred onto the transfer object so as to avoid the non-transfer portion.

Therefore, as shown in FIG. 14, the diffraction grating portion 151b is transferred in the state of avoiding the non-transfer portion 132. Accordingly, the diffraction grating portion 151b is not transferred to the portion of the character information of "DNP" which is of the non-transfer portion 132. As described above, because the character information of "DNP" of the non-transfer portion 132 is transparent in the visible light, there is a gap in the portion of the character information of "DNP". Thus, the second diffraction grating transfer portion 130 is formed. The method of forming the third diffraction grating transfer portion 140 is similar to the method of forming the second diffraction grating transfer portion 130. The final image 100 can be formed on the transfer object 200 by the above procedures. In a process of performing the usual three-color printing after printing on the transfer object 200 by using the visible transfer sheet 123, the final image 100 may be formed on the transfer object 200 by performing the printing with the invisible transfer sheet 133 or the optical diffraction structure transfer sheet 150 in the described order or in the reverse order.

The present invention is not limited to the above mode, but the present invention could be realized in various modes. For example, although the final image 100 is formed in the whole of the recorded matter A in the second mode, the final image 100 may be formed in a part of the recorded matter A. The heating method for the thermal transfer is not limited to the method with the thermal head. Any method of being able to perform the dot transfer may be used. For example, the laser beam may be used. In this case, it is necessary to provide a layer having the opto-thermal conversion function in each thermal transfer sheet. In the second mode, all the transfers are performed by the thermal transfer method. However, the non-transfer portions 132 and 142 and the images 122a, 122b, 131 and 141 concerning of the optical diffraction structure may not be formed by the thermal transfer method.

To the thermal transfer sheets 123, 133, and 150, the back face layer may be provided outside each of the base material sheets 124, 134, and 153 in order to prevent fusion with a heating element such as the thermal head or to improve the sheet-feed characteristics. The back face layer can prevent the back face from adhering to the surface layer such as the fluorescent ink layer, when transfer film is wound in a roll, or when the sheets are stacked. Preferably the back face layer has the heat slide-resistant property and mold releasing property. Examples of the back face layer include materials, such as hardening silicone oil, hardening silicone wax, a silicone resin, a fluororesin, and an acryl resin, which have the releasing property. The thickness of the back face layer ranges generally from 0.1 to 0.3 µm.

Moreover, additional layers may be laminated on the above-described layers as long as the present invention can be realized. For example, an adhesion layer corresponding to the transfer object 200 may be provided in the uppermost portion of each of the thermal transfer sheets 123, 133, and 150.

The character transfer portion 122b is not limited to the character information, but a predetermined shape such as a symbol and a pattern may be used as character transfer portion 122b. Moreover, the portion where a predetermined shape is formed by the transferred diffraction grating 151b is not limited to be one portion. In addition to the thermal transfer information portion 121, variable information can also be increased, so that the degree of security is enhanced while the purpose of use is extended. The patterns and characters shown in the hologram transfer portion 110, the first diffraction grating transfer portion 120, the second diffraction grating transfer portion 130, and the third diffraction grating transfer portion 140 are not limited to the above-described modes.

In the formation of the second diffraction grating transfer portion 130 and the third diffraction grating transfer portion 140, the diffraction grating portion 151b may previously be transferred so as to avoid the shapes of the non-transfer portions 132 and 142. In this case, because gaps are formed in the shapes of the non-transfer portions 132 and 142, the stealth ink can be applied in the gaps. In the case where the stealth ink is applied later, the uppermost surfaces of the non-transfer portions 132 and 142 may not contain the mold releasing agent. The printing may obviously be performed not with the stealth ink but with the normal visible ink.

The invention claimed is:

1. An image forming method in which an image including recorded information and a first optical diffraction structure portion is formed, the method comprising:
    forming the first optical diffraction structure portion by transferring an optical diffraction structure layer to a transfer object, the optical diffraction structure layer including an optical diffraction structure provided in an optical diffraction structure transfer sheet the recorded information being recorded with an ink invisible in visible light on the transfer object,
    wherein the optical diffraction structure layer including the optical diffraction structure is transferred by moving a thermal head such that the transferred first optical diffraction structure portion forms a shape on the transfer object indicating information having a predetermined relationship to information indicated by the recorded information.

2. An image forming method according to claim 1, further comprising:
    transferring an optical diffraction structure using the optical diffraction structure transfer sheet; and
    transferring ink using an ink transfer sheet having an ink layer layered on a base material sheet, the ink layer including an invisible ink portion formed by the invisible ink,
    wherein the optical diffraction structure layer has a hologram portion where a hologram indicating a predetermined shape is formed and a diffraction grating portion, where a diffraction grating is formed so that the diffraction grating portion and the hologram portion are provided at positions corresponding to positions where to transfer the hologram and the diffraction grating on a transfer object respectively, and
    the optical diffraction structure transfer process includes:
        a first optical diffraction structure transfer process of transferring the diffraction grating of the optical diffraction structure layer to form the first optical diffraction portion;
        a second optical diffraction structure transfer process of transferring the diffraction grating of the optical diffraction structure layer from the optical diffraction structure transfer sheet to the transfer object while a particular area of the transfer object is avoided, so that the particular area is surrounded by the transferred diffraction grating as a second optical diffraction structure portion the particular area having a shape indicating a predetermined information; and
        a third optical diffraction structure transfer process of transferring the hologram of the hologram portion on a portion of the transfer object, except portions of the first optical diffraction structure portion and the second optical diffraction structure portion including the particular area, and
    in the ink transfer process, the ink layer is transferred from the ink transfer sheet to the particular area having the predetermined shape.

3. The image forming method according to claim 2, wherein the diffraction grating of the diffraction grating portion in the optical diffraction structure layer is transferred in the second optical diffraction structure transfer process after the ink layer is transferred in the ink transfer process.

4. The image forming method according to claim 3, wherein a transfer layer including the ink layer is laminated on the base material sheet, and the transfer layer is transferred to the transfer object so that a layer containing a mold releasing agent is left on a surface of the transfer layer.

5. The image forming method according to claim 2, wherein the ink layer is transferred in the ink transfer process after the diffraction grating of the diffraction grating portion in the optical diffraction structure layer is transferred in the second optical diffraction structure transfer process.

6. The image forming method according to claim 2, wherein the particular area has a linear shape.

7. The image forming method of claim 1, wherein
    the layer including the optical diffraction structure transfer has a hologram portion where a hologram indicating a predetermined shape is formed and a diffraction grating portion where a diffraction grating is formed, and in the optical diffraction structure layer, the diffraction grating portion and the hologram portion are provided at positions corresponding to positions where to transfer the hologram portion and the diffraction grating on the transfer object respectively, and
    the diffraction grating in the diffraction grating portion is transferred on the transfer object such that the transferred diffraction grating forms the shape indicating information indicating the predetermined shape, and
    the hologram in the hologram portion is transferred on a portion of the transfer object except for a portion where the diffraction grating is transferred.

* * * * *